June 20, 1939.　　　A. C. MAYFIELD　　　2,162,689
FERTILIZER DISTRIBUTOR
Filed March 16, 1936　　　4 Sheets-Sheet 1

A. C. Mayfield
Inventor

By C. A. Snow & Co.
Attorneys.

June 20, 1939.  A. C. MAYFIELD  2,162,689
FERTILIZER DISTRIBUTOR
Filed March 16, 1936  4 Sheets-Sheet 3

A. C. Mayfield Inventor
By C. A. Snow & Co.
Attorneys.

June 20, 1939.　　A. C. MAYFIELD　　2,162,689
FERTILIZER DISTRIBUTOR
Filed March 16, 1936　　4 Sheets-Sheet 4
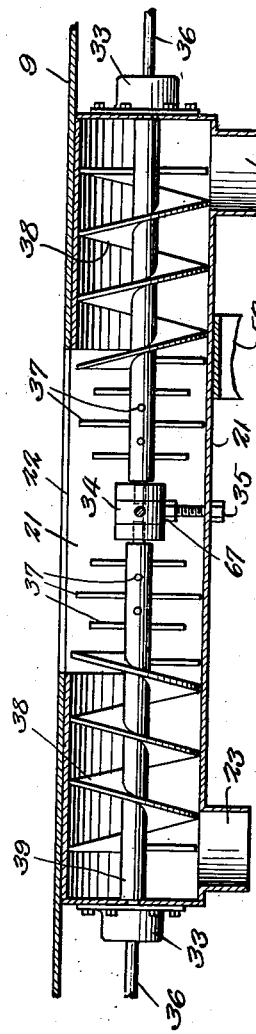
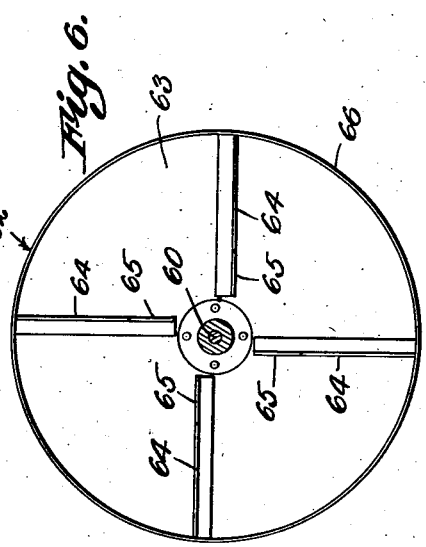
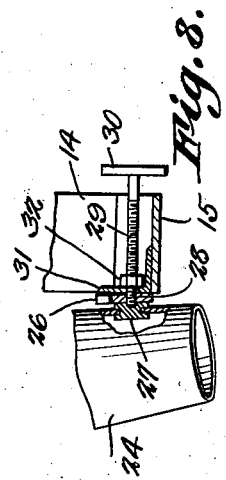
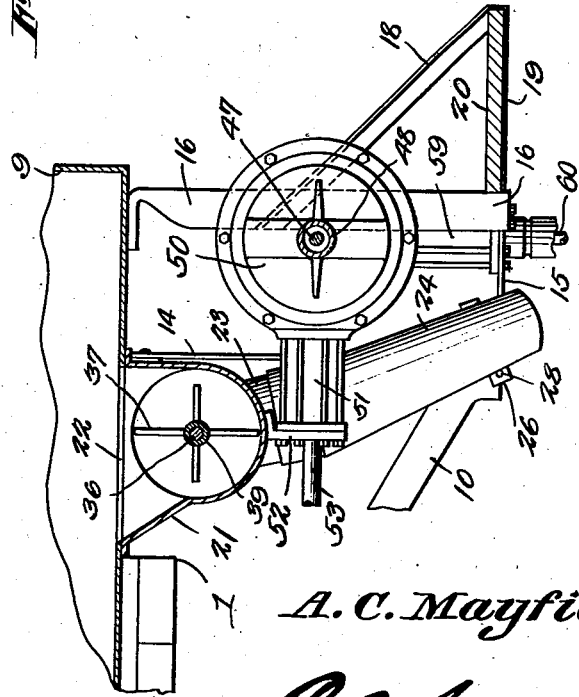
A. C. Mayfield
Inventor Patented June 20, 1939

2,162,689

UNITED STATES PATENT OFFICE 2,162,689

FERTILIZER DISTRIBUTOR

Alfred Coppock Mayfield, Largo, Fla., assignor to Ken-Jon, Inc., Orlando, Fla., a corporation of Florida Application March 16, 1936, Serial No. 69,236

2 Claims. (Cl. 275—8)

This invention aims to provide a simple but effective means whereby commercial fertilizer or the like may be broadcast through the instrumentality of a simple means, capable of being attached to and driven by a truck or similar vehicle. The object of the present invention is the provision of a material distributor having broadcasting means, one on each side of the vehicle for distributing the material from both sides thereof, and of feeding means for conveying the material, to the broadcasting means from a hopper or other source of supply on the vehicle, the broadcaster or broadcasters and the conveying means being actuated from the vehicle or vehicle propelling means and there being, further, control means (preferably a transmission) for changing the rate of speed of actuation of the feeding means in a predetermined ratio (preferably 1, 2 and 4) with respect to the speed of travel of the vehicle, or to stop the feeding means, without changing the speed of the broadcasters which remain in constant speed with the speed of the vehicle. The provision of broadcasters on each side of the vehicle permits an efficient and positive control of distribution, from either or both sides in varying amounts, each independent of the other so as to serve the conditions or requirements at each side of the vehicle. Consequently, the amount of material broadcast, in any unit area and at any given vehicle speed, may increased or decreased with respect to the vehicle speed, or stopped, without stopping the vehicle, thus enabling, in the case of fertilizer, control of delivery of the material from as little as thirty-five (35) bushels to as high as two tons to the acre.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 4 is a vertical section on the line 4—4 of Fig. 3, parts being broken away;

Fig. 5 is a vertical longitudinal section of the conveyor mechanism;

Fig. 6 is a plan of the distributor;

Fig. 7 is a fragmental side elevation of the spout and sundry parts carried thereby;

Fig. 8 is a fragmental transverse section disclosing the mechanism for adjusting the spout with respect to the axis of rotation of the distributor.

Figure 1:
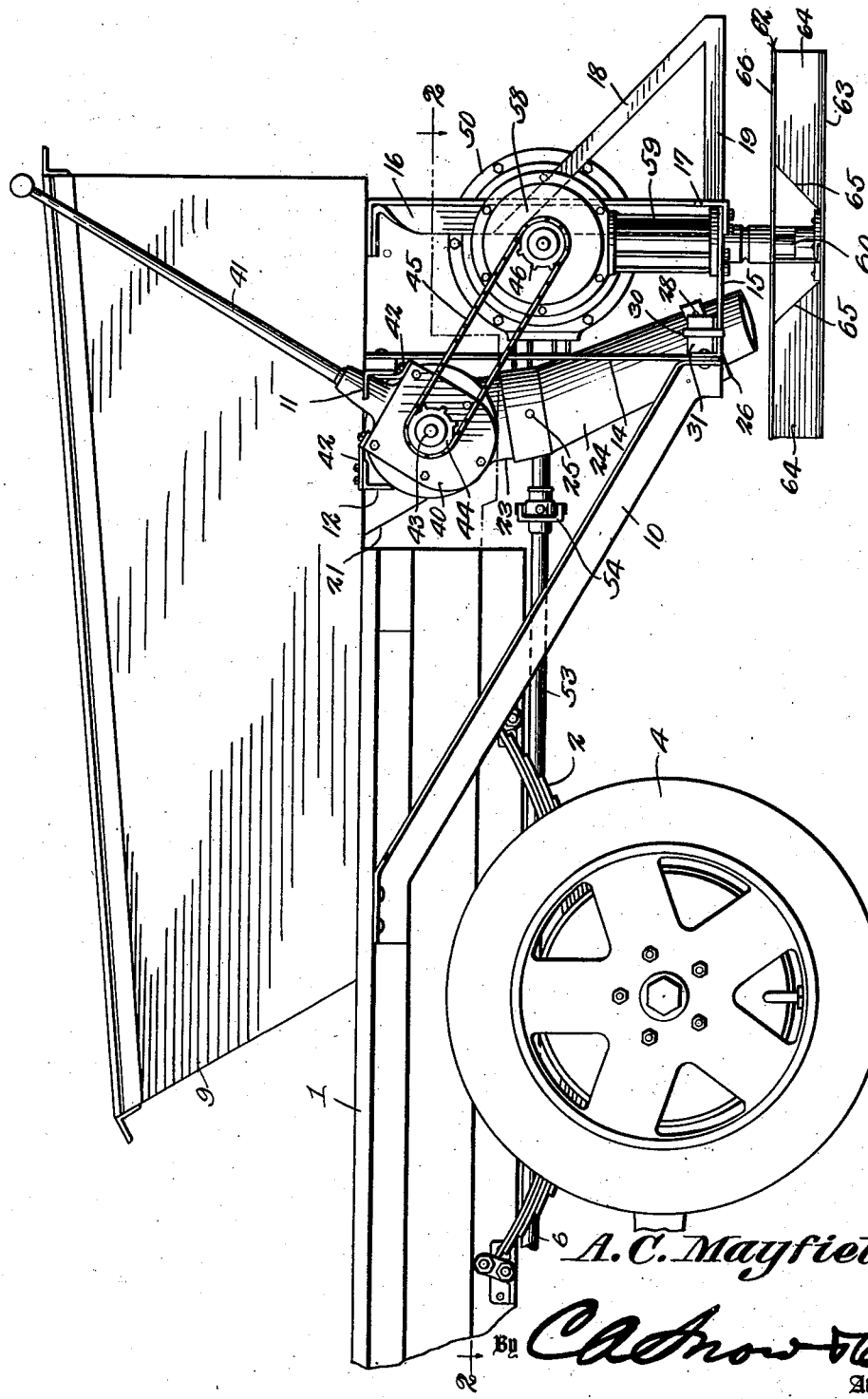
Fig. 1 shows, in side elevation, the device claimed, assembled with a portion of a truck.
Figure 2:
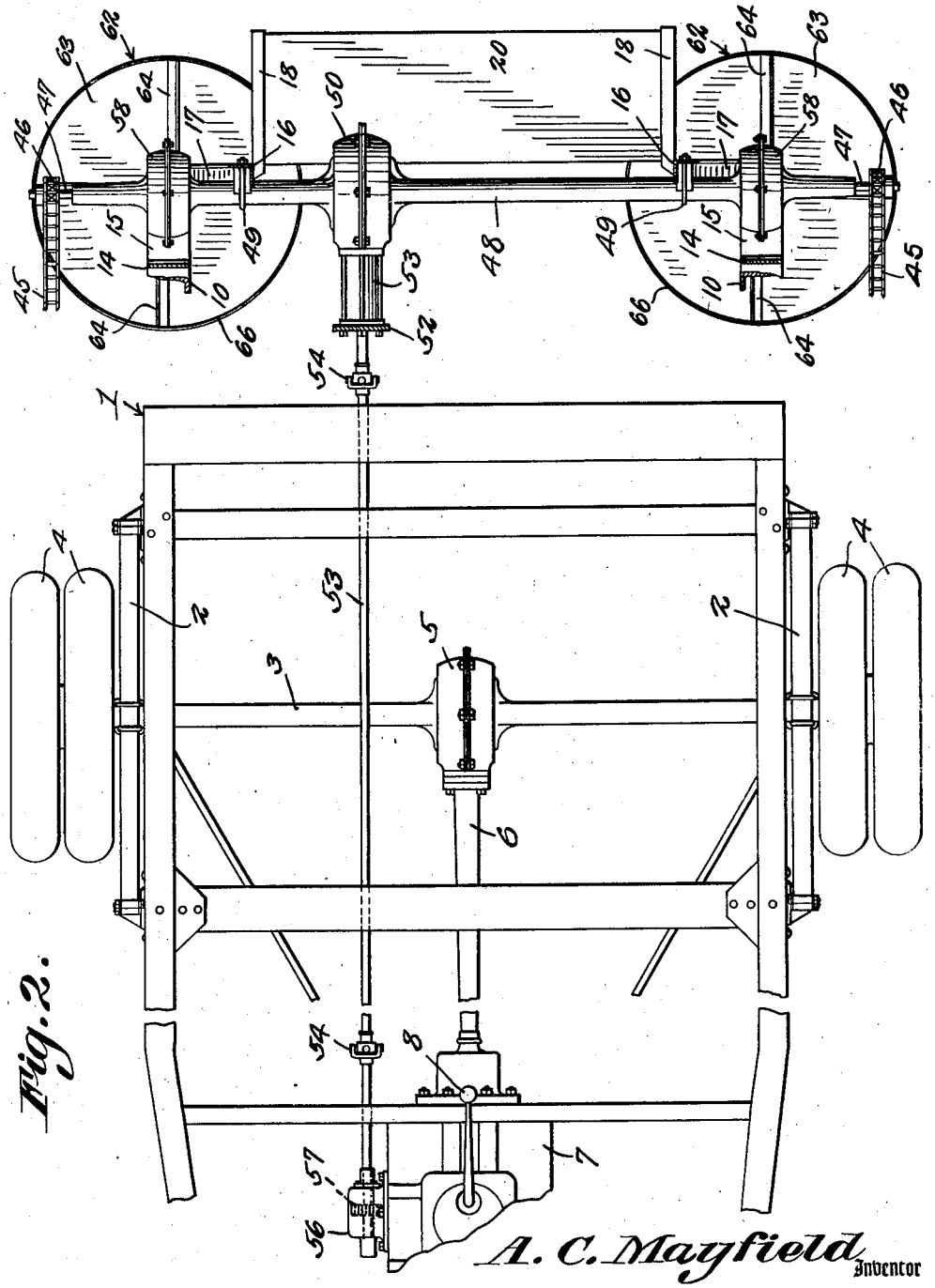
Fig. 2 is a horizontal section on the line 2—2 of Fig. 1, the truck frame and attendant parts appearing in plan.

The device may be used on trucks of various kinds, but by way of illustration, there is shown in Figs. 2 and 1, a truck frame 1, having springs 2 to which the rear axle housing 3 is attached, the rear wheels being shown at 4, and the differential at 5. The differential is operatively connected at 6 with the transmission mechanism, indicated sufficiently by the numeral 7.. The means for operating the transmission, at the will of an operator, to cause it to turn the wheels 4 at different speeds is designated by the numeral 8. A hopper 9 is mounted on the truck frame 1 and extends rearwardly with respect to the truck frame, as shown in Fig. 1.

Figure 3:
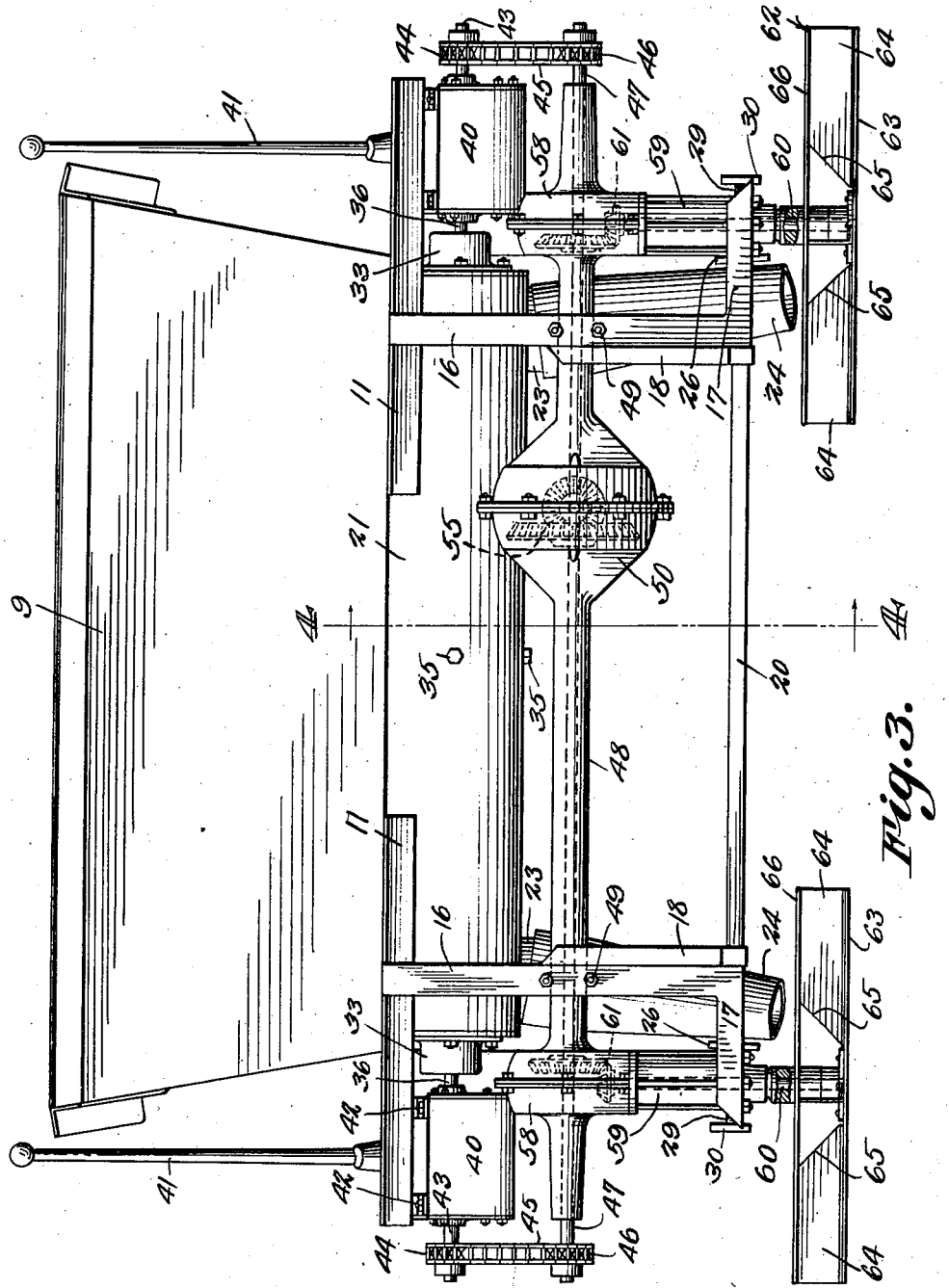
Fig. 3 is a rear elevation, remote parts being omitted.

An auxiliary frame carrying a hopper is provided and may be assembled with the truck frame 1 and carries most of the working parts of the device. The auxiliary frame embodies downwardly and rearwardly inclined braces (Fig. 1), marked by the numeral 10, and having their forward ends connected to the truck frame 1. Rear cross bars 11, shown in Fig. 3, are secured to the bottom of the hopper 9 and project outwardly beyond the sides of the hopper. Similar forward bars 12 (Fig. 1) are secured to the bottom of the hopper 9, in front of the bars 11. The upper ends of vertical posts 14 are connected to the rear cross bars 11 (Fig. 1) and the lower ends of these posts are connected to the rear ends of the inclined braces 10. Horizontal rearwardly extended members 15 are secured to the lower ends of the posts 14 and to the rear ends of the braces 10.

The upper ends of vertical hangers 16 (Figs. 3 and 1) are attached to the bottom of the hopper 9. The hangers 16 have outwardly projecting rectangular arms 17 (Fig. 3) to which the rear ends of the horizontal members 15 are connected (Fig. 1). Downwardly and rearwardly inclined supports 18 (Fig. 1) are attached (Fig. 3) to the hangers 16, and have forwardly extended parts 19

(Fig. 1) supporting a platform 20 (Figs. 3 and 4), located behind and below the hopper 9.

A tubular transverse conveyor casing 21 (Figs. 5 and 4) is secured to the bottom of the hopper 9. The material in the hopper 9 finds its way into the conveyor casing through good-sized registering holes 22 in the bottom of a hopper and in the top portion of the conveyor casing 21. Near to its ends, the conveyor casing 21 has depending outlet sleeves 23. The sleeves 23 enter the upper ends of depending spouts 24. The spouts 24 are pivoted at 25 (Fig. 1) to the sleeves 23 for backward and forward movement. The reason for this movement will be better understood after the description as a whole has been read. Let it suffice to say that the purpose of mounting the spouts 24 for swinging adjustment is to vary the position of their lower ends with respect to horizontal rotary distributors, here mentioned incidentally, and designated generally by the numeral 62 in Fig. 1.

The means for holding the spouts 24 in the position to which they may have been swung is detailed in Figs. 7 and 8 and is shown in Fig. 1. It comprises strip-like keepers 26, each having a longitudinal line of threaded holes 28. Pivot members 27 (Fig. 8) connect the keepers 26 with the spouts 24. Latch screws 29 are provided. They have turning heads 30 at their outer ends. The latch screws 29 are threaded into angle brackets 31 secured to the horizontal members 15 of the auxiliary frame. The latch screws 29 are adapted to be engaged in the threaded holes or seats 28 of the keepers 26 on the spouts 24. The construction, obviously, is such that the spouts 24 are held in adjusted positions with respect to the axes of rotation of the rotary horizontal distributors 62. The latch screws 29 are held against backing out by means of lock nuts 32 threaded on the screws (Fig. 8) and engaging the angle brackets 31. The reason for pivotally mounting the keepers 26 on the spouts 24, at 27, is that the spouts swing from the point 25 of Fig. 1, and the pivotal mounting of the keepers 26, at 27, enables the inner ends of the latch screws 29 to engage in any of the seats 28 of the keepers.

Figures 5 and 3 show that the conveyor casing 21 has end bearings 33. An intermediate bearing 34 is located in the conveyor casing 21 and is held adjustably in place by any suitable means, such as screws 35, threaded into the conveyor casing 21 and provided with lock nuts 67 for engaging the bearing 34 (Fig. 5).

The inner ends of shafts 36 are journaled in the intermediate bearing 34. The shafts 36 are journaled in the end bearings 33 and extend out of the conveyor casing 21, at the ends thereof. Sleeves 39 are secured to the shafts 36. The sleeves 39 carry radial agitators or rods 37 (Figs. 5 and 4) located on opposite sides of the intermediate bearing 34 and below the hole 22, through which the material passes from the hopper 9 into the conveyor casing 21. The purpose of the agitators 37 is to aid in feeding the material downwardly into the intermediate portion of the conveyor casing 21, and to loosen the material, so that it may be worked upon readily by worm conveyors 38 secured to the sleeves 39 and operating in the conveyor casing 21 outwardly of the agitators 37. The worm conveyors 38 carry the material laterally in opposite directions (Fig. 5) to the sleeves 23, the sleeves 23 discharge the material into the depending spouts 24 of Fig. 3, and the spouts deliver the material into the rotary horizontal distributors 62.

The means for operating the shafts 36, the worm conveyors 38 and the agitators 37 of Fig. 5 will now be described. Figure 3 shows that the shafts 36 are operatively connected with speed changing devices 40, which may be what are commonly called transmissions, provided with upstanding actuating members 41 in the form of levers, accessible to a person standing on the platform 20 of Fig. 4, at the rear of the machines. It is manifest from Fig. 1, that the speed changing devices 40 are secured at 42 to the cross bars 11 and 12.

The outwardly extending shafts 43 (Fig. 3) of the speed changing devices 40 carry sprocket wheels 44 (Fig. 1). The operator can change (by hand) the sprocket wheels 44 to any desired size, to obtain further ranges of speed of rotation imparted to the shaft 36 of Fig. 5, and parts carried by it. The sprocket wheels 44 of the speed change devices 40 cooperate with downwardly inclined sprocket chains 45 (Fig. 1) engaged with sprocket wheels 46. The sprocket wheels 46 are secured to a horizontal transverse shaft 47 (Fig. 3). The shaft 47 is journaled in a horizontal tubular housing 48. The housing 48 is secured at 49 (Figs. 3 and 2) to the hangers 16.

An intermediate gear casing 50 (Figs. 3 and 2) is interposed in the tubular housing 48. The gear casing 50 has a forwardly projecting bearing 51. The forward end of the bearing 51 is secured to a depending bracket 52 (Figs. 4, 2 and 5) attached to the bottom portion of the conveyor casing 21. A longitudinal shaft 53 (Figs. 2 and 4) is journaled in the bearing 51. Universal joints 54 may be interposed in the shaft 53 wherever desired. The rear end of the shaft 53 is connected to the transverse shaft 47 by beveled gears 55 (Fig. 3) located in the casing 50. The forward end of the shaft 53 (Fig. 2) extends into a small housing 56 attached to the side of the main transmission casing 7. In the housing 56 is located means 57, such as a gear wheel, whereby the shaft 53 is operatively connected to the main transmission in the casing 7. On many tractors, the transmission casing 7 is slotted as it comes from the manufacturer, so that a power take-off may be provided at the point specified.

Fig. 2 shows that outer casings 58 are interposed in the housing 48 on opposite sides of the intermediate casing 50. The outer gear casings 58 have depending bearings 59 (Figs. 1 and 3) and these bearings are secured to the horizontal members 15 of the auxiliary frame, and to the outwardly extended arms 17 (Fig. 3) of the hangers 16. Vertical shafts 60 (Fig. 3) are journaled in the bearings 59. The upper ends of the shafts 60 are connected by beveled gears 61 (Fig. 3) with the shaft 47. The gears 61 are housed in the outer casings 58.

The horizontal rotary distributors 62 (hereinbefore mentioned) of Fig. 1 are secured to the lower ends of the vertical shafts 60. The construction of the distributors 62 will be understood by comparing Figs. 6 and 1. Each distributor 62 comprises a disc 63 having upstanding radial blades 64 secured thereto, the inner end edges of the blades 64 being inclined, as shown at 65 and spaced from the axes of rotation of the distributors, that is, the axes of the shafts 60 of Fig. 3. The upper outer corners of the blades 64 are connected by rings 66 spaced from the disc 63, thus leaving the distributors open at their peripheries, so that the material to be distributed may be flung laterally and outwardly therefrom by centrifugal force in Fig. 3.

The drive for the shafts 36, the worm conveyors 38 and the agitators 37 of Fig. 5 embraces the following parts: the main transmission 7 of Fig. 2, the connecting mechanism 57, the longitudinal shaft 53, the beveled gears 55 of Fig. 3, the shaft 47, the sprocket wheels 46, the sprocket chains 45, the sprocket wheels 44, the shafts 43, the speed change devices 40 (under the control of an operator by way of the handles 41), the shafts 36, the worm conveyors 38 and the agitators 37.

The drive for the rotary horizontal distributors 62 of Fig. 3 is taken off the shaft 47 by way of the beveled gears 61, the vertical shafts 60 are rotated, and the shafts 60 rotate the distributors 62.

The path of the material is from the hopper 9 of Fig. 1 through the holes 22, into the conveyor casing 21 of Fig. 5, the material first being worked upon by the agitators 67, and then being advanced, outwardly and laterally in opposite directions, by the conveyors 38, to the sleeves 23, the sleeves 23 discharging into the spouts 24, and the spouts delivering the material into the rotary horizontal distributors 62.

The adjustment of the spouts 24 toward and away from the axes of rotation of the distributors 62 has been dealt with hereinbefore. Here refer again to Figs. 7, 8 and 1.

The device is adapted to be used for many purposes, but one of which will be mentioned. It may be employed to broadcast commercial fertilizer in citrus groves. Noting Fig. 2, it will be obvious that the distributors 62 are rotated in consonance with the speed of the vehicle, since the shaft 53 is connected to the main transmission 7. It may be assumed, therefore, that the rotary distributors 62 ordinarily deliver the fertilizer in a fixed amount.

When the truck is driven between two rows of trees, and should a tree in either row be missing, then, the attendant on the platform 20 may put the handle 41 of the proper speed change device 40 into neutral position—thus, the operation of its corresponding conveyor means 38 is disconnected stopping further feed of the fertilizer to its broadcasters; and should the conditions be that a tree needs more or less fertilizer, then, by manipulating the handle 41 to proper speed change device 40 the speed of its conveyor 38 will be varied correspondingly to supply the amount to be distributed, it being preferred that the speed change transmission devices 40 have gear ratio changes of 1-2-4. Thus it is manifest that varying amounts required to be distributed may be delivered on both sides of the vehicle by manipulating both of the handles 41, or on one side alone by manipulating but one of the said handles.

Because the chute 24 can be swung toward and away from the axis of rotation of the distributor 62, the distance that the fertilizer is thrown broadcast and laterally can be regulated, and it is possible, also, in this way, to regulate to a considerable extent the direction of distribution of the fertilizer.

As to the actual ejection of the fertilizer, it is of course thrown out by the blades 64 of the distributor 62, as the distributor is rotated.

Structurally, one of the useful features of the device comprises the two axially alined conveyor shafts 36 of Fig. 5, together with the means exemplified at 47, 45 and 40 in Fig. 3, for rotating the said shafts at different speeds under the governance of an operator.

Having thus described the invention, what is claimed is:

1. In an ambulatory material distributor device of the class described to be drawn by or carried on a vehicle, a hopper, broadcasters supported for rotation adjacent to the hopper and arranged on opposite sides of the vehicle, means for rotating the broadcasters, a conveyor casing into which the hopper discharges, shafts journaled in the conveyor casing, conveyors carried by the shafts, means for conducting material from the conveyors to the broadcasters, a shaft supported for rotation adjacent to the hopper and extending transversely of the vehicle, means for rotating the transverse shaft, means for connecting the transverse shaft with the conveyors, and speed changing devices interposed in the last-specified means.

2. In a device of the class described, a hopper, a frame associated with the hopper, a conveyor casing into which the hopper discharges, axially alined shafts journaled in the conveyor casing, a transverse shaft supported for rotation on the frame, means for connecting the transverse shaft operatively with the conveyors, speed changing devices interposed in the last-specified means and individual to the axially alined shafts, substantially vertical shafts supported for rotation on the frame, broadcasters carried by the last-specified shafts, means for conducting material from the conveyors to the broadcasters, and means for connecting the substantially vertical shafts with the transverse shaft.

ALFRED COPPOCK MAYFIELD.